UNITED STATES PATENT OFFICE.

GEORGE W. LEWIS, OF SCRANTON, PENNSYLVANIA, ASSIGNOR TO SAMUEL H. BAIRD, OF NEW YORK, N. Y.

METHOD OF MAKING CORES OF SAND.

960,973.   Specification of Letters Patent.   Patented June 7, 1910.

No Drawing.   Application filed February 17, 1910.   Serial No. 544,364.

*To all whom it may concern:*

Be it known that I, GEORGE W. LEWIS, a citizen of the United States, residing in Scranton, in the county of Lackawanna and State of Pennsylvania, with post-office address at Scranton, have invented certain new and useful Improvements in Methods of Making Cores of Sand, of which the following is a specification.

This invention relates to an improved method of making cores of sand for molding metals.

The invention has for its object the improvement of methods for making cores by reducing the quantity of oil required and thereby decreasing the cost of the cores.

In the making of cores, as now carried on, so far as I am aware, the practice is to mix simultaneously in one operation the necessary amount of sand, the required quantity of oil and a certain percentage of water. After the mixing is completed in any suitable mixer, the mixture of sand, water and oil is pressed into shape and then baked to give the core the required degree of hardness. When cores are made in this way the quantity of oil required is relatively large and, as the oil is the most expensive of the materials used in making cores, it is a desideratum of importance to reduce the quantity of oil as much as possible.

The improved method of making cores which constitutes the present invention, consists in, first, mixing the oil and water very intimately so as to form an emulsion; then mixing the emulsion so formed with the sand; and, finally, forming the core and baking it in the usual manner. I have found by experiment that the quantity of oil required by this method is much smaller than by the old method. The proportions of oil and water employed in the improved method will ordinarily range from fifty per cent. of oil and fifty per cent. of water to twenty per cent. of oil and eighty per cent. of water; but proportions outside of this range may also be found to give satisfactory results.

In mixing the oil and water for making cores according to this invention, any suitable form of mixing apparatus may be employed, and the oil used is the same as that employed in the making of cores by the methods now in use.

Having thus described my invention, what I claim as new and desire to secure by Letters Patent is:

1. The improved method of making cores which consists in, first, mixing intimately so as to form an emulsion a suitable quantity of oil and water, then mixing the emulsion so formed with sand, next forming the mixture into a core and, finally, baking the core so formed.

2. The method of making cores for molding metals which consists in, first, forming an emulsion of oil and water comprising from fifty to eighty per cent. by volume of water, intimately mixing the emulsion with sand, shaping cores of the mixture and, finally, baking the cores so formed.

In testimony whereof, I have signed my name hereto in the presence of witnesses.

GEORGE W. LEWIS.

Witnesses:
H. D. MILLAR,
WM. C. BURG.